Patented May 20, 1941

2,242,849

UNITED STATES PATENT OFFICE 2,242,849

CATALYST AND PROCESS OF PREPARING THE SAME

Jan Louis de Roos, The Hague, Netherlands

No Drawing. Application July 29, 1936, Serial No. 93,229. In the Netherlands August 1, 1935

7 Claims. (Cl. 252—213)

Many reactions proceeding under the influence of a catalyst need careful control of the temperatures within narrow limits. It is often very difficult to fulfill this condition, particularly in the case of exotherm reactions. In toluene-air mixtures a minute grain of the catalyst turning to a dull red heat may produce an explosion. In less dangerous cases often an undesired compound may be formed.

These difficulties are due in most cases to the poor heat conductivity of the catalysts in use.

The objects of the present invention are a catalyst and a process of making same, the said catalyst being so formed that it will conduct the developed reaction heat away from the catalytic material, the particles of the latter being set in the surface of a solid metal body, which is a skeleton of crystalline structure wherein the catalytic material is embedded. According to this invention, the particles of the catalytic material may be distributed throughout the said metallic body, so as to enable the reactivating of the catalyst by means of a superficial treatment, when the activity of the catalyst has diminished by its use. The catalyst can be made so that even the smallest catalytic particles in action can only reach temperatures not considerably deviating from the mean temperature of the catalyst as a whole.

The use of the catalyst according to this invention practically avoids the above mentioned difficulties.

According to the present invention the process for making the catalyst is performed by a pulverized catalytic material being throughout embedded or distributed in a metallic body, the latter being brought to a plastic condition. Preferably the metal is used in the form of a powder together with catalytic material in the same form and is subjected to a moulding treatment under high pressure and then to a heat treatment transforming the metal powder into the embedding solid medium. The metal powder can be mixed with the catalytic material, so that the latter is distributed throughout the final catalyst. The metal powder can contain different elements and also the catalytic material can contain more than one substance. Good results are obtained with a quantity of metal powder exceeding 50% by volume of the final catalyst under application of pressure and a heat treatment at a degree of temperature at least approximately that of the melting point of the embedding metal. The heat treatment can follow the moulding under pressure and is preferably carried out in an inert atmosphere.

With these general statements of the objects and purposes of my invention I will now proceed to describe the embodiment thereof and the particular manner in which my invention may be carried out, and it will be understood that while I have described what may be considered as a preferable embodiment of my invention, I do not limit myself to the precise conditions or proportions herein set forth, as they may be varied by those skilled in the art in accordance with the particular purposes for which they are intended and the conditions under which they are to be utilised.

In preparing the catalyst I prefer to use one part by weight of vanadium pentoxyde and 1.15 parts by weight of aluminum powder. These ingredients are mixed thoroughly and then moulded under a pressure of some thousands (e. g. 3000) atmospheres preferably in the form of tablets. Thereafter said tablets are placed in an electric furnace and are heated at a temperature of 600 degrees C. during six hours. With the said ingredients the atmospheric air is sufficiently inert to prevent undesirable reactions. After the application of the pressure the embedding medium in the tablets has a structure of a strongly deformed powder. By the heat treatment said structure changes into that of a regulus.

The catalyst obtained in this way is particularly efficient for partial oxydations of organic substances, for instance the phthalic of naphthalene to anhydrous phthalic acid.

I claim:

1. The process of making a catalyst which comprises mixing solid pulverized catalytic particles with a finely divided metal medium until the catalytic particles are distributed throughout said medium, applying to the mixture under substantially atmospheric temperature a pressure of some thousands of atmospheres, thereby producing a dense body having an intimate surface contact between the metal medium and the catalytic particles, and then as the final treatment in manufacture applying to the mixture under substantially atmospheric pressure a sufficient temperature of equal intensity throughout the mass over a sufficient period of time to cause only recrystallization of the metal medium, thereby making permanent said intimate surface contact and insuring in this manner effective heat transmission between the medium and said particles.

2. The process of making a catalyst which comprises mixing solid pulverized catalytic particles with a finely divided metal medium until the catalytic particles are distributed throughout said medium, applying to the mixture under substantially atmospheric temperature a pressure of some thousands of atmospheres, thereby producing a dense body having an intimate surface contact between the metal medium and the catalytic particles, and then as the final treatment in manufacture, applying to the mixture under substantially atmospheric pressure a temperature of equal intensity throughout the mass below but near the melting point of the metal medium over a sufficient period of time to cause only recrystallization of the metal medium, thereby making permanent said intimate surface contact and insuring in this manner effective heat transmission between the medium and said particles.

3. The process of making a catalyst which comprises mixing solid pulverized vanadium pentoxide with aluminum powder until the vanadium pentoxide particles are distributed throughout said aluminum powder, applying to the mixture under substantially atmospheric temperature a pressure of some thousands of atmospheres, thereby producing a dense body having an intimate surface contact between the aluminum powder and the vanadium pentoxide, and then as the final treatment in manufacture, applying to the mixture under substantially atmospheric pressure a temperature of equal intensity throughout the mass of substantially 600° C. for a period of substantially six hours, thereby making permanent said intimate surface contact and insuring in this manner effective heat transmission between the medium and said particles.

4. The process of claim 3, using substantially by weight one part of vanadium pentoxide to 1.15 parts of aluminum powder.

5. A catalyst consisting of a solid metal skeleton of crystalline structure with catalytic particles as inclusions produced by applying to a mixture of solid pulverized catalytic particles with a finely divided metal medium a pressure of some thousands of atmospheres under substantially atmospheric temperature, and subsequently applying to the so treated mixture under substantially atmospheric pressure a sufficient temperature of equal intensity throughout the mass over a sufficient period of time to cause only recrystallization of the metal.

6. A catalyst consisting of a solid metal skeleton of crystalline structure with catalytic particles as inclusions produced by applying to a mixture of solid pulverized catalytic particles with a finely divided metal medium a pressure of some thousands of atmospheres under substantially atmospheric temperature, and subsequently applying to the so treated mixture under substantially atmospheric pressure a sufficient temperature of equal intensity throughout the mass below but near the melting point of the metal over a sufficient period of time to cause only recrystallization of the metal.

7. A catalyst consisting of a solid aluminum skeleton of crystalline structure with particles of vanadium pentoxide as inclusions produced by applying to a mixture of solid pulverized vanadium pentoxide particles with aluminum powder a pressure of some thousands of atmospheres under substantially atmospheric temperature, and subsequently applying to the so treated mixture under substantially atmospheric pressure a temperature of equal intensity throughout the mass of substantially 600° C. for a period of substantially six hours.

JAN LOUIS DE ROOS.